(12) United States Patent
Williams

(10) Patent No.: US 10,358,060 B1
(45) Date of Patent: Jul. 23, 2019

(54) TORSIONALLY DEFORMING ENERGY ATTENUATOR

(71) Applicant: Armorworks Holdings, Inc., Chandler, AZ (US)

(72) Inventor: Scot Williams, Chandler, AZ (US)

(73) Assignee: Armorworks Holdings, Inc., Chandler, AZ (US)

( * ) Notice: Subject to any disclaimer, the term of this patent is extended or adjusted under 35 U.S.C. 154(b) by 0 days.

(21) Appl. No.: 15/650,753

(22) Filed: Jul. 14, 2017

(51) Int. Cl.
*B60N 2/42* (2006.01)
*F16F 1/14* (2006.01)
*B60N 2/80* (2018.01)

(52) U.S. Cl.
CPC ............. *B60N 2/4242* (2013.01); *F16F 1/14* (2013.01); *B60N 2002/899* (2018.02)

(58) Field of Classification Search
CPC ............. B60N 2/4242; B60N 2/42709; B60N 2002/899; F16F 1/14
See application file for complete search history.

(56) References Cited

U.S. PATENT DOCUMENTS

| | | | |
|---|---|---|---|
| 4,720,139 A * | 1/1988 | McSmith | B60N 2/4214 188/373 |
| 5,558,301 A | 9/1996 | Kerdoncuff et al. | |
| 5,791,597 A * | 8/1998 | Knoll | B60N 2/4242 244/121 |
| 5,820,058 A * | 10/1998 | Hirzel | B60R 22/34 242/379.1 |
| 5,964,428 A * | 10/1999 | Ogawa | B60R 22/3413 242/379.1 |
| 6,158,816 A * | 12/2000 | Howell | B60R 22/3413 242/379.1 |
| 7,938,485 B1 | 5/2011 | Perciballi et al. | |
| 8,342,300 B2 | 1/2013 | Guillon | |
| 8,403,410 B1 | 3/2013 | Pinger et al. | |
| 8,550,553 B1 | 10/2013 | Clark et al. | |
| 8,561,748 B1 | 10/2013 | Hahn et al. | |
| 8,678,465 B1 | 3/2014 | Aragon et al. | |
| 8,939,502 B2 | 1/2015 | Grant et al. | |
| 9,132,753 B1 | 9/2015 | Campbell | |
| 9,221,361 B1 | 12/2015 | Platt et al. | |
| 9,272,657 B1 | 3/2016 | Perciballi et al. | |

\* cited by examiner

*Primary Examiner* — Philip F Gabler
(74) *Attorney, Agent, or Firm* — James L Farmer

(57) ABSTRACT

Methods and apparatus are provided for a device that attenuates shock loads experienced by a body supported by a moveable structure during a high energy impact event. The device includes an elongated metal bar with a principal axis coinciding with a length dimension of the bar, and an anti-rotation member configured to rotationally fix the metal bar at a first torque application point to one of the body and the moveable structure. A torque application member is located at a second torque application point on the bar, and spaced apart from the anti-rotation member by a distance defining a working section of the bar. The torque application member is connected to the other one of the body and the moveable structure, and configured to impart a twisting moment to the working section of the bar proportional to an acceleration induced inertia load between the structure and the body.

16 Claims, 3 Drawing Sheets

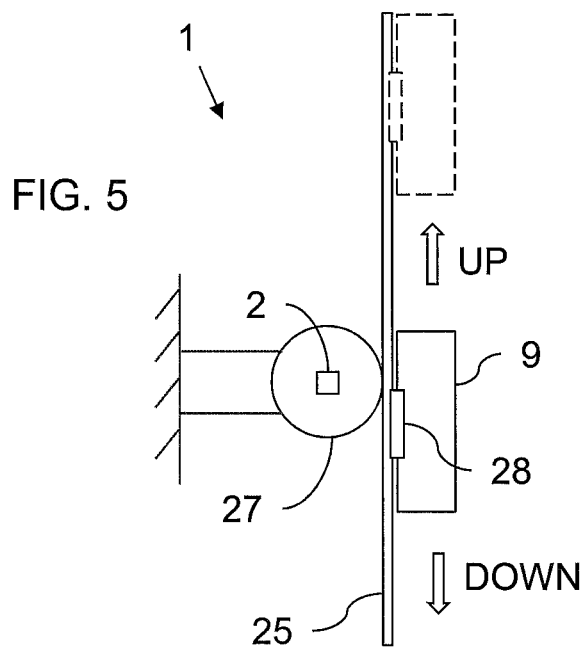
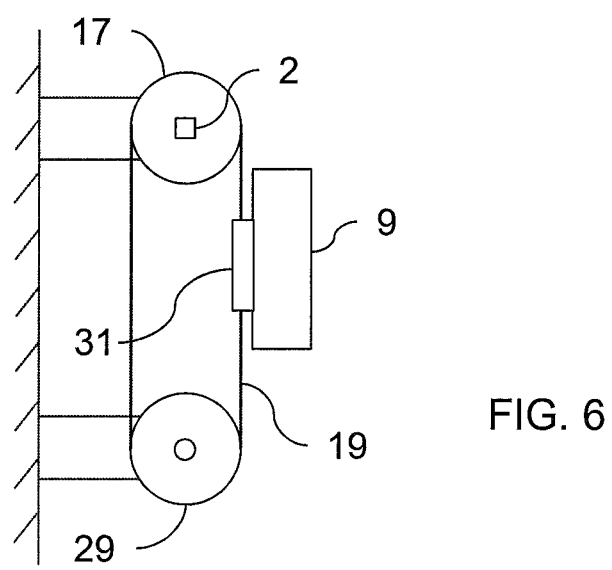

US 10,358,060 B1

TORSIONALLY DEFORMING ENERGY ATTENUATOR

TECHNICAL FIELD AND BACKGROUND

The technical field of the present invention relates to energy attenuation technology for reducing the severity of shock loads experienced by an object or person during a high energy impact event. The technical field may further relate to the incorporation of such technology in land vehicle, watercraft, and aircraft seating systems.

BRIEF DESCRIPTION OF THE DRAWINGS

In the accompanying drawings:

FIGS. 5 and 6 are schematic representations of linear type one-way interfaces between a body and an energy attenuating mechanism in accordance with the present disclosure.

DESCRIPTION OF THE EMBODIMENTS

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
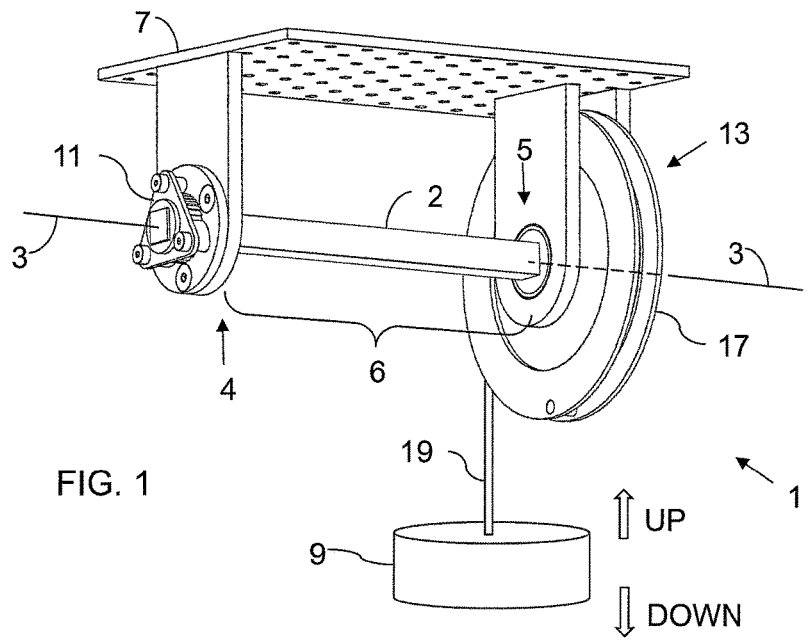
FIG. 1 is a perspective view of a torsionally deforming energy attenuating mechanism in accordance with the present invention.

An exemplary energy attenuating ("EA") mechanism in accordance with the present disclosure is indicated generally at reference numeral 1 in the drawing Figures. Referring initially to FIG. 1, the EA mechanism comprises an elongated metal bar 2 with a principal, or longitudinal axis 3 along a centerline of the bar. The bar 2 may have a symmetrical cross-sectional shape, such as the square bar shown, and may be formed from any metal capable of substantial plastic deformation, such as for example brass, stainless steel, or various aluminum alloys.

The EA mechanism forms part of a load path between a mobile structure 7, and a body 9 supported by the mobile structure. The EA mechanism may be attached to the structure as shown in FIG. 1, or alternatively to the body 9. The mobile structure 7 may be a vehicle, aircraft, watercraft, spacecraft, or other machine or construction exposed to external forces during normal use, and potentially very high external forces in certain extreme or catastrophic circumstances. In one exemplary embodiment the structure 7 is a vehicle, and the body 9 is a seat configured to displace, or stroke relative to the vehicle under extreme loading conditions. In this embodiment, inertia loads resulting from acceleration of the vehicle in a certain direction will be imparted to the structure by the body via the EA mechanism.

The bar 2 is rotationally locked relative to the structure 7 or the body 9 at a first torque application point 4 by an anti-rotation member 11. The anti-rotation member may be configured to completely fix the bar to the structure or body, such as by bolting or welding, or alternatively to allow for bar rotation in one direction while preventing rotation in an opposite direction.

Figure 2:
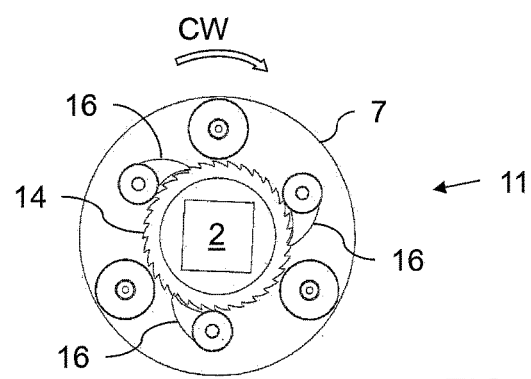
FIG. 2 is partially cutaway end view of the energy attenuating mechanism of FIG. 1 showing a ratchet type one-way anti-rotation member.

Anti-rotation member 11 shown in FIG. 1 is an example of such a one-way device in the form of a ratchet. Referring to FIG. 2, the ratchet includes a gear 14 fixed to the bar 2, and an array of spring loaded pawls 16, mounted in this case to the mobile structure 7, and positioned to engage the teeth of gear 14. As can be seen, the pawls will move out of the way and allow the bar and gear to rotate in a clockwise direction (arrow "CW"), but will prevent the bar from rotating by wedging against the gear if the bar and gear try to rotate in the opposite, or counterclockwise direction.

A torque application member 13 is attached to the bar at a second torque application point 5 on the bar. The first and second torque application points are spaced apart, defining there-between a working section 6 of the bar. The torque application points may be at the ends of the bar as shown, or alternatively one or both torque application points may be at an intermediate point on the bar away from the ends. The torque application member 13 may be any component or device capable of applying a torque to the bar, such as a wrench, a bracket, a gear, and the like.

In the depicted embodiment the torque application member 11 is a pulley 17 attached to the bar, with a cable 19 extending from the pulley to the body 9. When a load is applied to the cable 19 by the body 9 generally in the plane of the pulley, a corresponding torque is applied by the pulley 17 to the bar at the second torque application point 5. If the bar is rotationally fixed to the structure at the first torque application point 4, or if the applied torque is in a rotational direction corresponding to the locked direction of the anti-rotation member 11, the torque will be transmitted from the cable and pulley through the working section 6 of the bar, and reacted by the structure 7 with an equal and opposite torque at the first torque application point. The result is a twisting moment in the working section of the bar equal to the product of the load applied to the cable and the moment arm, which in the depicted embodiment is the radius of pulley 17.

Thus, the EA mechanism is configured to convert a generally linearly directed weight or inertia force between the body and the structure into a twisting moment applied to the bar. It should be appreciated however that the configuration described above and shown in FIG. 1, wherein the body 9 is connected to the torque application member 13 and the bar is rotationally locked to the structure 7 at the first torque application point 4, is purely arbitrary, and the configuration could be reversed without changing the scope or content of the invention. More specifically, the EA mechanism 1 could be instead mounted to or integrated with the body 9, with the bar 2 rotationally locked to the body 9 at the first torque application point, and the torque application member 13 connected to structure, such as by cable 19. As in the depicted embodiment, weight or inertia force between the body and the structure again results in a torque that is reacted in this case by the body 9, and a twisting moment applied to the working section of the bar.

Regardless of the configuration, relative motion between the structure and body is resisted by the EA mechanism. Assuming, except for bar 2, that all portions of EA mechanism 1 in a load path from the structure 7 to the body 9 are substantially un-deformable, then relative motion between the body and the structure in a direction that will produce a torque can only occur by torsional deformation of bar 2. In one embodiment the working section of the bar is configured to remain substantially rigid and prevent any permanent relative movement between the structure and body so long as the magnitude of a torque producing load between structure and body is less than a predetermined threshold value. If the threshold load is reached, the working section is configured to plastically deform by twisting about the principal axis in a progressive, predictable manner, thereby allowing the body and structure to displace relative to one another as the bar proportionately deforms and attenuates energy.

The threshold load is typically a maximum load, usually expressed in G's, that can be safely experienced by the body, or experienced without causing unacceptable damage or injury. For example, in a vehicle seat application in which the seat is configured to stroke relative to the vehicle during a blast or impact event, the threshold load may be a maximum allowable G-force at the seat. In such an application the magnitude of the force may be selected so as to be survivable by a seated occupant having a body weight within a specified range.

With an established threshold load, the working section of the bar may be configured accordingly. Design parameters affecting the mechanical response of the bar to a body load may include the ratio of the body load to applied torque, bar material, bar temperature, bar length, cross-sectional area and shape, and other factors. In one embodiment the design parameters are chosen to result in the onset of permanent torsional deformation of the working section of the bar occurring when the threshold load is reached.

The bar is further configured to limit the maximum inertia load between the structure and body when the structure is subjected to a high energy, explosive, or otherwise catastrophic external structure loading event, referred to herein interchangeably as a "high energy impact event", or "impact event", or "high energy event". Such an event is further intended to mean generally one with enough energy to accelerate the structure at a rate sufficient to produce a body inertia load that is substantially above an allowable, or threshold value.

Figure 3:
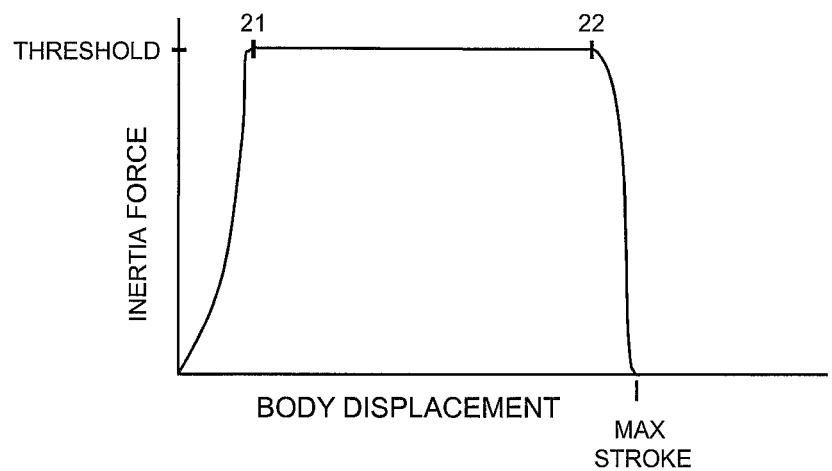
FIG. 3 is a load vs. displacement plot showing an exemplary profile of an attenuated reaction force between a moveable structure and a body supported by the structure.

FIG. 3 is an exemplary plot showing body inertia force versus body displacement relative to a supporting structure during a high energy event in which the load path goes through the EA mechanism 1. At the onset of the event, the body inertia load quickly ramps up as the structure is accelerated by the initial energy impulse.

An impact event is typically described and defined in terms of a triangular impulse, or acceleration, increasing linearly from zero to a peak and back to zero within a matter of milliseconds. The peak acceleration value is much greater than any allowable human acceleration level, and typically more than twice the defined allowable. With respect to the present invention, the practical effect is a near instantaneous step increase in the structure to body closing velocity from zero to some peak value. In the case of an under-vehicle explosion event for example, the vehicle (structure) is instantaneously accelerated upward toward the seat (body) to a peak velocity, delivering the triangular acceleration impulse to the seating system. Typical peak instantaneous closing velocities during such impact events may be in a range of about 150 to 400 inches per second.

Referring again to FIG. 3, the inertia load imparted to the structure by the body increases rapidly during the initial impulse and acceleration until reaching the threshold value, indicated by numeral 21. At that point, torque induced stresses in the bar of the EA mechanism surpass the material yield strength, producing gross cross-section yielding. The ensuing plastic torsional deformation of the bar prevents the load from increasing further, and will continue for as long as the remaining event energy is sufficient to maintain the threshold load. If there is enough physical space (or stroke length) between the body and the structure to reach the point at which the event energy drops below that point, indicated in FIG. 3 at numeral 22, deformation of the bar and motion of the body will both immediately come to a stop.

The ratio of the area under the exemplary force-displacement curve of FIG. 3 to the product of total displacement and peak force is one measure of the energy absorption efficiency of the system. According to this method, the most energy efficient system is one in which the force quickly ramps up to a peak, and remains at that peak value for as much of the available stroke as possible. EA devices configured to optimize efficiency in this manner are known as fixed load energy absorbers, or "FLEA".

If the event energy is absorbed in less than the available stroke, efficiency is lost, resulting in higher than necessary G loading of the body. Conversely, if event energy is not exhausted in the available stroke length, the body can bottom out against the structure, causing the load to spike, and G loads to exceed allowable levels. To minimize such loss of efficiency and load spikes, the EA mechanism may be configured to perform optimally for a certain body weight, or range of body weights.

In the vehicle application for example, the EA mechanism may be configured to perform at an adequate level of efficiency for seat occupants that fall within a specified weight range, or within a specified percentile range for a fully loaded soldier as specified in various military standards. The EA mechanism may be configured for efficiency using any of the previously mentioned design elements, namely adjusting the ratio of the body load to applied torque, bar material, bar temperature, bar length, cross-sectional area and shape.

For example, the EA mechanism may include a manual adjustment device for changing the moment arm of the torque application member 13, such as by shifting the cable 19 of FIG. 1 to a larger or smaller pulley. In another example, the EA mechanism may be operable to change the length of the working section of the bar by moving the location of one or the other torque application points. Such a device may comprise, for example, a release lever that allows the torque application member or the anti-rotation member 11 to be repositioned. Alternatively, the EA mechanism may be configured to passively or actively sense the static weight of the body 9, and automatically adjust any of the above mentioned parameters affecting the threshold load. Those skilled in the art will appreciate that various other adjustment concepts or combinations thereof may be employed to produce a desired change in the threshold load of the EA mechanism, and are considered foreseeable alternatives within the scope of the present invention.

In another embodiment the EA mechanism is configured to attenuate the energy of two sequential impact events. In this type of configuration the EA mechanism resets itself after the first impact event for subsequently attenuating the energy of the second event. The ability to reset in this manner is desirable for example in certain vehicle applications, and in particular vehicles exposed to the threat of an under-vehicle explosion such as from a mine or improvised explosive device (or IED).

Vehicles subjected to under-vehicle explosions can experience two sequential impact events in some circumstances. The first impact event is due to the initial explosion. If the energy impulse imparted to the vehicle from the explosion is large enough, the vehicle can be lifted off the ground to a substantial height. The second impact event, known as "slam down", occurs when the vehicle comes back to the ground. If the entire energy absorption capability of the EA mechanism is exhausted in the first impact event, then the body, or vehicle seat occupant, will be unprotected at slam down.

To attenuate the energy of two sequential events, EA mechanism 1 may be configured to have a useful deformation range that is large enough to accommodate the maximum available body displacement in both events. The useful deformation range may be the amount that the working section 6 of the bar can be torsionally deformed while attenuating energy at a predetermined adequate level of efficiency, or while maintaining a threshold load within a predetermined acceptable range. In this embodiment, a first portion of the useful deformation range is used in the first impact event, and a second portion of the useful deformation range is used in the second impact event, where the total of the first and second portions does not exceed the useful deformation range.

During a first impact event, the position of the body relative to the structure changes as the body strokes in a generally linear direction from a starting position at which there has been no deformation of the bar, to an ending position at which a first amount of bar deformation has occurred. The amount of bar deformation may be quantified as the amount of permanent twist of the working section measured in degrees. If at the body ending position all of the available stroking space has been used, the body must first be repositioned in the direction of the starting position in order to then utilize another portion of the useful bar deformation range. For this repositioning to occur, the EA mechanism must be configured to allow the body to move in the direction of the starting position between impact events.

Such directional freedom of motion may be obtained, for example, with the ratchet anti-rotation device of FIG. 2. When the body moves from the starting position toward the ending position, the torque application member applies a torque to the bar in a direction that causes the ratchet to lock, preventing the bar from rotating at the first torque application point 4. Thus, the body can only move in this direction by applying enough torque at the torque application point 5 to actually twist the working section of the bar. However when the body tries to move in the opposite direction, i.e. from the ending position toward the starting position, the applied torque is in the opposite direction and the ratchet releases, allowing the bar to freely rotate and the body to move unhindered by the EA mechanism.

Because the ratchet is configured to always lock in the stroking direction, any displacement of the body back toward the starting position is effectively locked in, reestablishing space for the body to stroke in a second impact event. Thus the EA mechanism effectively resets when the body moves back toward the starting position after a first impact event. Optimally the body will completely reset by moving all the way back to the starting position so that the entire available stroking space may be used again in a second impact event.

It should be appreciated that the location of the ratchet could be reversed, that is, the ratchet could be built into the torque application member at the second torque application point 5, with the bar fixed in both rotational directions at the first torque application point. In such an embodiment, the torque application member delivers torque to the bar in one rotational direction, and releases in the other direction. A torque applied through the ratchet is reacted by the structure or body at the first torque application point where the bar is fixed, again causing a twisting moment in the working section.

Depending upon the particular application and type of impact event, the body may or may not reposition itself to a starting position after a first impact event. In certain applications, the body can be expected to spontaneously reverse direction after the first impact event. For example, in the case of an under-vehicle explosion event with a seat configured to stroke toward the vehicle floor, the dynamics of the first impact event are such that the seat tends to rebound back toward the starting position, or away from the floor. Rebound can in fact be excessive in some circumstances, creating an intermediate impact, or "slam up", when the seat reaches the top of the stroking space.

However in other applications, physical circumstances may dictate that the body will not return to the starting position on its own. In such applications it may be necessary to urge the body back to the starting position between a first and second impact event.

Figure 4:
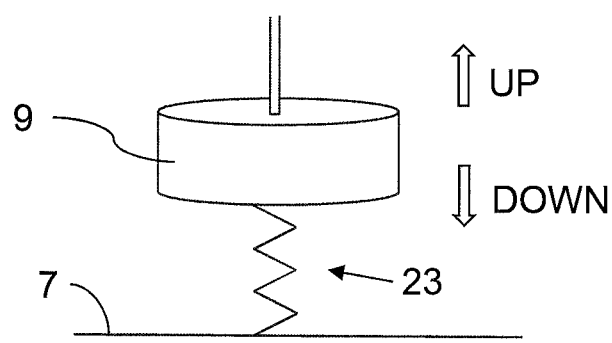
FIG. 4 is a schematic perspective representation of a mechanism for resetting the position of a body after having stroked in response to high energy impact event.

FIG. 4 illustrates a simple passive system for urging the body back toward the starting position comprising a spring 23 disposed between the body 9 and the structure 7. In the configuration shown, the spring compresses during a first impact event as the body strokes, in the direction indicated by the "down" arrow, from a starting position to an ending position. The spring force developed may be many times less than the inertia forces present during the impact event so as not to interfere with energy attenuation by the EA mechanism. After the first impact event when the inertia force has dissipated, the compressed spring will tend to expand and push the body in the direction of the "up" arrow back toward the starting position. The spring could alternatively be configured to extend instead of compress when the body strokes, and then pull the body back toward the starting position between events.

The ratchet device discussed previously is only one of many possible ways to accomplish reset of the body relative to the EA mechanism and structure. FIG. 5 is a schematic representation of one such alternative arrangement wherein the resetting occurs at the interface of the body and EA mechanism instead of within the EA mechanism. In the depicted embodiment, torque application to the bar 2 is through an elongated load carrying component in the form of a linear gear or rack 25 that engages a pinion gear 27 on the bar. The body is configured to slide or roll along the rack 25. A directional interface 28 locks the body to the rack when the body tries to move in one direction, such as the direction indicated by the arrow "down", and unlocks when the body tries to move in the opposite direction, in this case indicated by the arrow labeled "up". The directional interface may be a spring loaded pall device as discussed above in reference to FIG. 2, or any other suitable one-way mechanism.

In an impact event creating an inertia load in the locked ("down") direction, the body 9 and rack 25 stroke together, thereby rotating the pinion gear 27 and delivering torque to the bar 2. As discussed above, the EA mechanism may be configured so that only a first portion of the useful deformation range is used in an initial or first stroke. After the initial stroke is completed, the body can then reset by moving in the opposite, unlocked ("up") direction along rack 25. In FIG. 5 the dashed outline represents the position of the body relative to the rack after having reset. From this position the body and rack can stroke again in response to a second impact event, using a second portion of the useful deformation range of the EA mechanism.

The resetting embodiment of FIG. 5 is not limited to the rack and pinion system however, and could operate as well using the previously discussed cable (or cord) around a pulley, or chain around a gear. FIG. 6 illustrates one such cable and pulley embodiment. The cable 19 extends from the torque application pulley 17 down to a return pulley 29 and back around to the torque pulley 17 forming a loop. Alternatively the return pulley could be a take-up reel, in which case the cable would not loop back to pulley 17.

A one way interface 31 in this embodiment operates between the body and cable, locking when the body tries to move in one direction, and releasing the body to slide along the cable when the body tries to move in the opposite direction. Various types of one-way cable or rope locking devices may be utilized or adapted, such as for example an ascender mechanism used for climbing ropes. In the case of a chain instead of a cable, the locking feature could again be a simple pawl type device that engages the links of the chain in one direction. Moreover, many other alternatives or variations on the resetting embodiments of FIGS. 5 and 6 are possible, and considered to be within the scope of the present invention.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under § 112, 6th paragraph is not intended. Additionally, it is not intended that the scope of patent protection afforded the present invention be defined by reading into any claim a limitation found herein that does not explicitly appear in the claim itself.

What is claimed is:

1. An energy attenuating vehicle seat configured to stroke in a stroking direction over a stroking distance during a high energy impact event in which a vehicle containing the seat is accelerated in a second direction opposite the stroking direction at a rate exceeding an allowable level, comprising:
   an energy attenuating device disposed between the seat and vehicle, comprising:
      an elongated metal bar with a principal axis coinciding with a length dimension of the bar, and a substantially symmetrical cross section in a plane perpendicular to the principal axis;
      a first torque application point at a first position along the length dimension of the metal bar at which the bar is rotationally fixed to one of the seat and vehicle;
      a second torque application point at a second position along the length dimension of the metal bar spaced apart from the first position by a distance defining a working section of the bar;
      a torque application member at the second torque application point configured to convert a reaction force between the vehicle and seat into a twisting moment applied to the working section of the bar, wherein the working section of the bar is configured to torsionally deform through plastic deformation over a defined useful deformation range;
   a directional interface configured to connect the seat to the vehicle through a load path including the energy attenuating device when the seat is accelerated in the stroking direction relative to the vehicle, and to disconnect the seat from the load path and vehicle when the seat is accelerated in the second direction relative to the vehicle, wherein the energy attenuating device is configured to produce a first torsional deformation of the bar less than half the useful deformation range in response to a displacement by the seat in the stroking direction over the entire stroking distance.

2. The energy attenuating vehicle seat of claim 1, wherein the working section of the bar is configured to remain rigid and prevent the seat from moving relative to the vehicle as long as the magnitude of a reaction force between the seat and vehicle is less than a predetermined threshold value, and to torsionally deform through plastic deformation about the principal axis in a progressive, predictable manner in response to a reaction force equaling the threshold value, thereby allowing the seat to displace in the stroking direction relative to the vehicle as the bar deforms and attenuates energy.

3. The energy attenuating vehicle seat of claim 2, wherein the directional interface comprises a one-way mechanism configured to prevent the bar from rotating in one rotational direction while allowing the bar to rotate freely in an opposite rotational direction.

4. The energy attenuating vehicle seat of claim 3, wherein the one-way mechanism comprises:
 a rotating component attached to the bar; and
 a fixed component configured to directionally engage the rotating component.

5. The energy attenuating vehicle seat of claim 2, wherein the directional interface is configured to allow the seat to reset by moving in the second direction relative to the vehicle after a displacement in the stroking direction.

6. The energy attenuating vehicle seat of claim 1, wherein the bar is square in cross section.

7. The energy attenuating vehicle seat of claim 1, further comprising an elongated load transmitting component disposed between the seat and the torque application member, and constrained to movement in the stroking direction, wherein a force applied to the to the elongated load transmitting component in the stroking direction by the seat imparts a proportional twisting moment to the working section of the bar.

8. The energy attenuating vehicle seat of claim 7, wherein the directional interface comprises a one-way mechanism configured to lock the seat to the elongated load transmitting component when the seat is accelerated in the stroking direction relative to the vehicle, and to release the seat from the elongated load transmitting component when the seat is accelerated in the second direction relative to the vehicle.

9. The energy attenuating vehicle seat of claim 8 wherein the load transmitting component is a rack gear, and the one-way mechanism is a pall.

10. The device of claim 8, wherein the load transmitting component is a cable or cord, and the directional interface is an ascender mechanism.

11. An energy attenuating vehicle seat configured to stroke in a stroking direction over a stroking distance during a high energy impact event in which a vehicle containing the seat is accelerated in a second direction opposite the stroking direction at a rate exceeding an allowable level, comprising:
 an energy attenuating device disposed between the seat and vehicle, comprising:
  an elongated metal bar with a principal axis coinciding with a length dimension of the bar, the bar rotationally fixed at a first torque application point on the bar to one of the seat and the vehicle; and
  a torque application member at a second torque application point on the bar spaced apart from the first torque application point by a distance defining a working section of the bar, the torque application member configured to impart a twisting moment to the working section of the bar proportional to an acceleration induced inertia load between the vehicle and the seat, wherein the working section of the bar is configured to torsionally deform through plastic deformation over a defined useful deformation range;
 a directional interface configured to connect the seat to the vehicle via a load path through the energy attenuating device when the seat is accelerated in the stroking direction relative to the vehicle, and to disconnect the the seat from the vehicle when the seat is accelerated in the second direction relative to the vehicle, wherein the energy attenuating device is configured to produce a first torsional deformation of the bar less than the useful deformation range in response to a displacement by the seat in the stroking direction over the entire stroking distance.

12. The energy attenuating vehicle seat of claim 11, wherein the working section of the bar is configured to remain rigid and prevent the seat from moving relative to the vehicle as long as the magnitude of a reaction force between the seat and vehicle is less than a predetermined threshold value, and to torsionally deform through plastic deformation about the principal axis in a progressive, predictable manner in response to a reaction force between the seat and vehicle exceeding the threshold value, thereby allowing the seat to move in the stroking direction as the bar torsionally deforms and attenuates energy.

13. The energy attenuating vehicle seat of claim 11, further comprising an elongated load transmitting component disposed between the seat and the torque application member, and constrained to movement in the stroking direction, wherein a force applied to the to the elongated load transmitting component in the stroking direction by the seat imparts a proportional twisting moment to the working section of the bar.

14. The energy attenuating vehicle seat of claim 13, wherein the directional interface comprises a one-way mechanism configured to lock the seat to the elongated load transmitting component when the seat is accelerated in the stroking direction relative to the vehicle, and to release the seat from the elongated load transmitting component when the seat is accelerated in the second direction relative to the vehicle.

15. The energy attenuating vehicle seat of claim 11, wherein the directional interface comprises a one-way mechanism configured to prevent the bar from rotating in one rotational direction while allowing the bar to rotate freely in an opposite rotational direction.

16. The energy attenuating vehicle seat of claim 15, wherein the one-way mechanism comprises:
 a rotating component attached to the bar; and
 a fixed component configured to directionally engage the rotating component.

* * * * *